Figure 1:
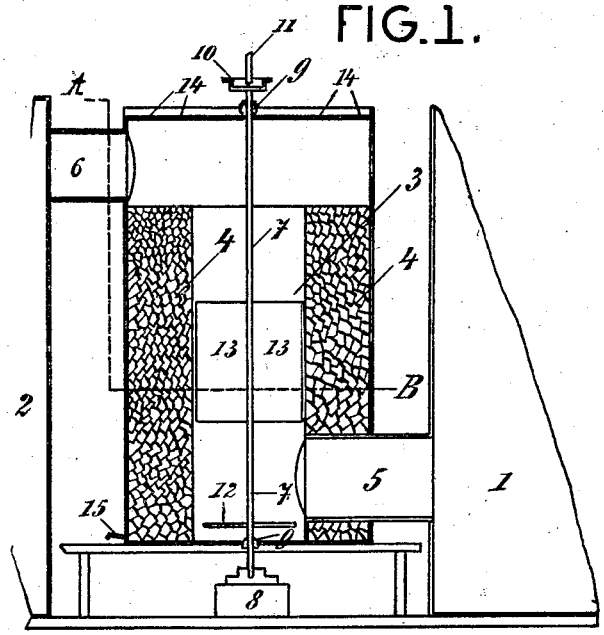

No. 848,631. PATENTED APR. 2, 1907.
R. CELLARIUS.
TOWER FOR SULFURIC ACID PLANTS.
APPLICATION FILED DEC. 14, 1905.

Witnesses:
Matth. Henn
With. Afshauer

Inventor:
Richard Cellarius
By Wilhelm Kirsch
Attorney

UNITED STATES PATENT OFFICE.

RICHARD CELLARIUS, OF SERGIEVSKOI POSAD, RUSSIA.

TOWER FOR SULFURIC-ACID PLANTS.

No. 848,631.　　　Specification of Letters Patent.　　Patented April 2, 1907.

Application filed December 14, 1905. Serial No. 291,687.

*To all whom it may concern:*

Be it known that I, RICHARD CELLARIUS, director, a subject of the Emperor of Germany, and a resident of Sergievskoi Posad, Russia, have invented new and useful Improvements in Manufacture of Sulfuric Acid, of which the following is a specification.

In manufacturing sulfuric acid by the chamber process it is important on the one hand that a rarefaction of the gases acting on each other—*i. e.*, the sulfurous acid, air, steam, and nitrous oxids—happen as little as possible and on the other hand that the sulfuric-acid vapors produced are eliminated in a condensed liquid condition as quickly as possible. Assuming that to a certain chamber system more sulfurous acid is supplied than can be possibly worked up, the sulfurous acid is indeed oxidized into sulfuric acid; but the latter cannot perfectly come into condensation within the chamber. This results in a dilution of the Gay-Lussac acid and in the interruption of the chamber process. Now one has already tried to overcome these drawbacks by providing condensers behind or between the chambers and by supplying diluted sulfuric acid or water in the direction opposite or transversely to the flow of the gases, whereby one limited, however, the mutual action simply to the contact of the two substances during their straight passage through the condenser in which one inserted sometimes the known resistances. Now in order to increase the effect of such condensations the present invention provides means by which the method herein described is accomplished, this method effecting an intimate mixture of the gases and condensing medium as well as a perfect elimination of liquid and other undesirable ingredients, such as dust particles and the like, which may have entered the chamber. The gases leaving the first chamber are before entering the second chamber led through a lead turret, the walls of which are filled with coke, and there set into a vivid whirling action, so that the gas particles are, together with steam, thrown against the coke walls, which are irrigated with diluted sulfuric acid or water from the top of the turret and compelled to press themselves against each other as well as against the damp coke, whereby a very effective condensation of the acid vapor and through the medium of the irrigating acid or water a quick elimination from the gas mixture of the sulfuric acid produced is obtained.

The uncondensed particles of the different gases travel upward within the coke, whereby they are further mixed and deprived from their condensable substances.

The steam is not supplied directly to the chamber, but to the lead turret in such a manner that it is led through a paddle-turbine placed in the turret, the turbine being set in motion by the reaction of the steam, so that a very vigorous whirling action on the gas particles and the steam is obtained.

The greater the supply of gas the more steam must be introduced, and the more effectively works the turbine, and vice versa, so that want of steam and rotary speed coincide with each other. In this way the supply to steam is regulated according to the quality of the sulfuric acid produced, exactly as is the case with the normal chamber process. Between the second and third chamber, third and fourth chamber, and so on similar turrets are provided.

The chambers can of course be entirely dispensed with and the gases led directly from one turret into the other.

To put the method into practice, the following apparatus is employed: A lead turret of about eighty inches diameter is mounted between the chambers in such a manner that its bottom is placed about twenty inches higher than the bottom of the chambers. The turret is at its inner walls fitted with a layer of coke of about twenty inches thickness, so that in the interior of the turret a space of about forty inches diameter is left.

Instead of with coke the turret may be fitted with perforated ring-plates.

The gases are led into the lower part of the space left in the middle of the turret, while they are allowed to escape at the upper part of the turret.

A turbine with paddles is inserted in the middle space of the turret, while the hollow axle of the turbine passing beyond the turret is closed up against the top of the turret by a water seal.

Figure 2:
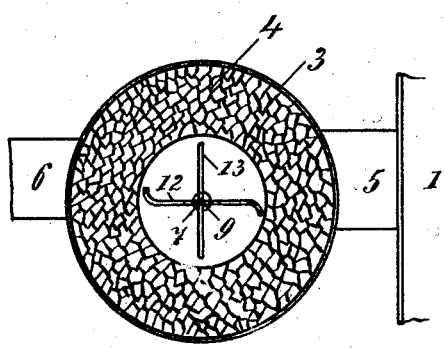

In the accompanying drawings, Figure 1 shows by way of example, in vertical central section, one suitable constructional form of one of the intermediary turrets, while Fig. 2 is a horizontal section on the line A B of Fig. 1.

Between the chambers 1 and 2 the turret 3 is mounted, which is fitted at its inner walls with a layer of coke 4, held in position by any suitable means. Into the lower part of the space left in the middle of the turret the gas-inlet pipe 5 from chamber 1 is led, while the gas-outlet pipe 6 branches off from the upper part of the turret and leads into the chamber 2. Through holes in the center of the top and bottom of the turret the steam-supply pipe 7 is passed and supported with its lower closed extremity in a bearing 8, placed underneath the bottom of the turret, the passages of the steam-pipe through the bottom and top of the turret being made air-tight by water seals 9. The upper extremity of the steam-pipe 7, projecting beyond the top of the turret is, through the medium of a stuffing-box 10, connected to the steam-pipe 11, so as to allow of the steam-pipe 7 being rotated by the reaction of the steam escaping through the oppositely-directed arms 12, disposed somewhat below the orifice of the gas-inlet pipe 5. Somewhat above this orifice two turbine-paddles 13 are fixed to the steam-pipe 7 and disposed in opposite directions, so as to project very near to the coke layer 4. The latter is adapted to be irrigated with diluted sulfuric acid or water through perforation 14, provided in the top of the turret, while at the bottom of the turret the drawing-off pipe 15 for the sulfuric acid produced is disposed.

Having fully described my invention, what I claim, and desire to secure by Letters Patent, is—

In the manufacture of sulfuric acid, an apparatus for eliminating the chamber-gases from the readily-produced sulfuric acid, by setting the gases, during their passage from one chamber to the next following one, together with steam in vivid whirling motion and throwing them against damp coke, comprising in combination a lead turret 3, a layer of coke 4 provided at the inner walls of said turret, a gas-inlet pipe 5 led into the lower part of said turret, a gas-outlet pipe 6 branched off from the upper part of said turret, a steam-supply pipe 7 passed through the center of said turret and provided at its passages through the top and bottom of said turret with water seals 9 to make said passages air-tight, a bearing 8 placed underneath the bottom of said turret and adapted to support the closed end of said steam-pipe 7 so as to let the latter revolve therein, oppositely-directed arms 12 made hollow and disposed somewhat below the orifice of said gas-inlet pipe 5 and adapted to set by the reaction of the steam escaping through them the steam-pipe 7 in rotation, and paddles 13 fixed to said steam-pipe 7 somewhat above the orifice of said gas-inlet pipe 5 and adapted to set the gases together with the steam into vivid whirling motion and to throw them on to the layer of coke which is made damp by acid or water introduced through perforations 14 in the top of said turret, substantially as described and shown.

In testimony whereof I have hereunto set my hand in the presence of two subscribing witnesses.

RICHARD CELLARIUS.

Witnesses:
FRANK E. BAINES,
GUSTAV ARNSTEIN.